(12) United States Patent
Souetre

(10) Patent No.: US 7,866,448 B2
(45) Date of Patent: Jan. 11, 2011

(54) AIRCRAFT BRAKE PARTICULARLY ADAPTED FOR MOUNTING ON A CONICAL AXLE

(75) Inventor: Jean Souetre, Boulogne (FR)

(73) Assignee: Messier-Bugatti, Velizy Villacoublay (FR)

( * ) Notice: Subject to any disclaimer, the term of this patent is extended or adjusted under 35 U.S.C. 154(b) by 738 days.

(21) Appl. No.: 11/878,822

(22) Filed: Jul. 27, 2007

(65) Prior Publication Data

US 2008/0302614 A1 Dec. 11, 2008

(30) Foreign Application Priority Data

Jun. 5, 2007 (FR) .................................. 07 04021

(51) Int. Cl.
*F16D 55/36* (2006.01)
(52) U.S. Cl. .................................... 188/71.5; 188/18 A
(58) Field of Classification Search ............... 188/71.3, 188/71.4, 71.5, 18 A; 244/110 A, 110 H, 244/111
See application file for complete search history.

(56) References Cited

U.S. PATENT DOCUMENTS

| | | | | |
|---|---|---|---|---|
| 2,844,219 A | * | 7/1958 | Collier | 188/18 A |
| 2,992,705 A | * | 7/1961 | Chisnell et al. | 188/71.5 |
| 3,480,115 A | | 11/1969 | Lallemant | |
| 3,498,418 A | * | 3/1970 | Dewar | 188/71.5 |
| 3,977,631 A | | 8/1976 | Jenny | |
| 4,696,376 A | * | 9/1987 | Reynolds | 188/71.5 |
| 5,323,881 A | * | 6/1994 | Machan et al. | 188/71.5 |
| 6,702,068 B1 | * | 3/2004 | Riebe | 188/71.5 |
| 2004/0011602 A1 | * | 1/2004 | Souetre et al. | 188/71.5 |

FOREIGN PATENT DOCUMENTS

| EP | 1 510 719 A | 3/2005 |
|---|---|---|
| EP | 1 653 111 A | 5/2006 |

* cited by examiner

*Primary Examiner*—Thomas J Williams
(74) *Attorney, Agent, or Firm*—Sughrue Mion, PLLC

(57) ABSTRACT

The invention relates to an aircraft brake for braking a wheel received on an axle presenting in succession a large-diameter cylindrical upstream portion, a conical portion, and a smaller-diameter cylindrical downstream portion suitable for receiving the wheel, the brake comprising:
- a stack of disks;
- a structural engaged on the axle and having the disks mounted thereon, the structural part comprising a support member for receiving braking actuators and including a centering portion for centering the structural part on the upstream cylindrical portion of the axle; and a torsion tube receiving the disks, the torsion tube being made integrally with the support member and the centering bearing surface and extending substantially to extend the centering bearing surface in register with the conical portion of the axle; and
- a braking force takeup member separably fitted on a free end of the torsion tube remote from the centering bearing surface.

4 Claims, 1 Drawing Sheet

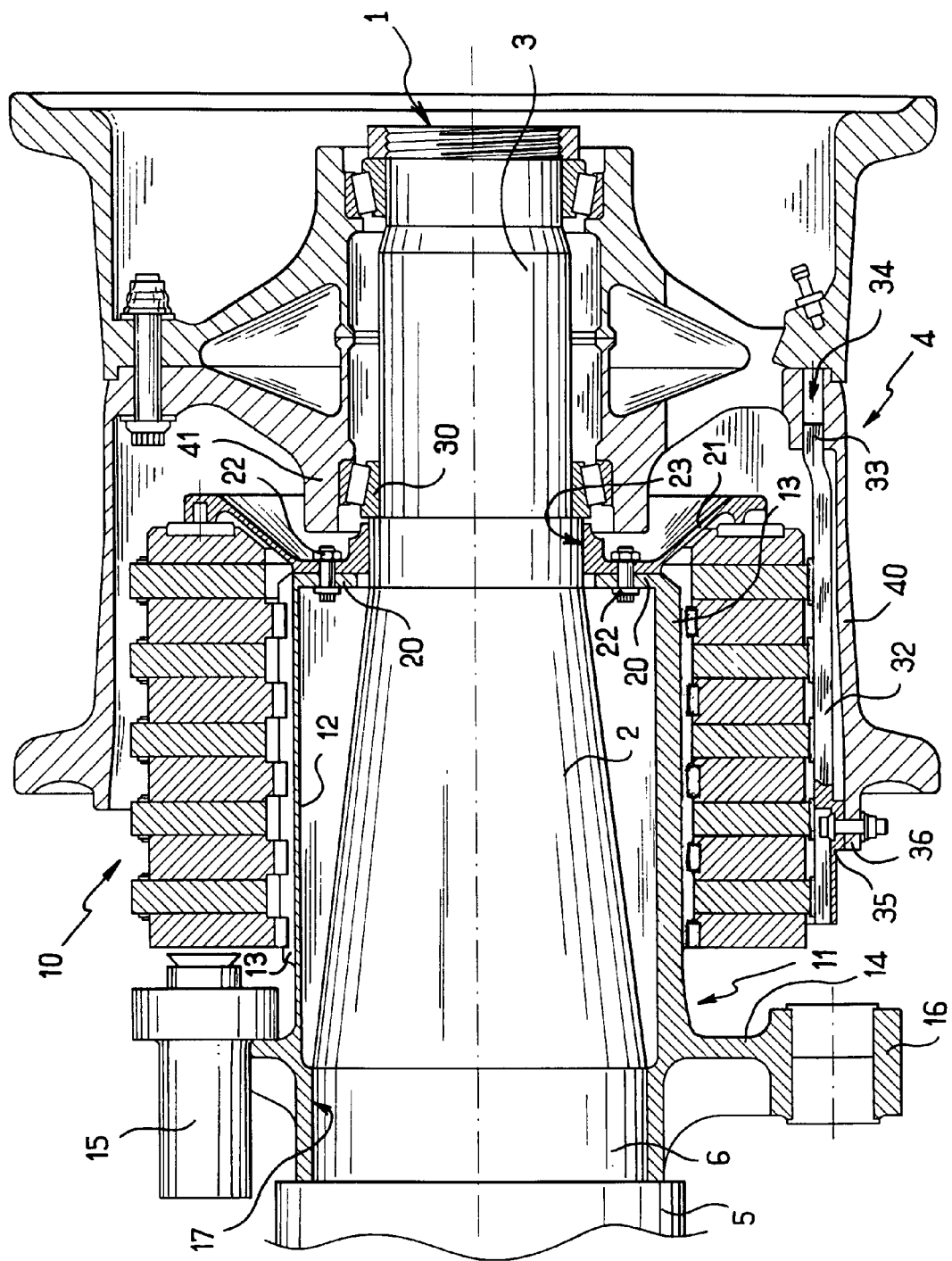

AIRCRAFT BRAKE PARTICULARLY ADAPTED FOR MOUNTING ON A CONICAL AXLE

The invention relates to an aircraft brake particularly adapted for mounting on a conical axle.

BACKGROUND OF THE INVENTION

Aircraft brakes are known that comprise a stack of disks made up of rotor disks and stator disks, the stack extending axially around an axle carrying a wheel, the rotor disks being constrained to rotate with the wheel that is to be braked, while the stator disks are prevented from rotating on a torsion tube engaged around the axle.

In recent programs, proposals have been made to place wheels farther apart for the purpose of limiting the pressure exerted by their tires on the runway, which leads to providing axles that are longer, and in particular that present a large-diameter cylindrical upstream portion, followed by a conical portion, and finally followed by a smaller-diameter cylindrical downstream portion that receives the wheel.

OBJECT OF THE INVENTION

An object of the invention is to provide a brake that is particularly adapted to that type of axle.

BRIEF DESCRIPTION OF THE INVENTION

Accord to the invention, there is provided an aircraft brake for braking a wheel received on an axle presenting in succession a large-diameter cylindrical upstream portion, a conical portion, and a smaller-diameter cylindrical downstream portion suitable for receiving the wheel, the brake comprising:
 a stack of disks;
 a structural part engaged on the axle and having the disks mounted thereon, the structural part comprising:
  a support member for receiving braking actuators and including a centering portion for centering the structural part on the upstream cylindrical portion of the axle, and
  a torsion tube receiving the disks, the torsion tube being made integrally with the support member and the centering bearing surface and extending substantially to extend the centering bearing surface in register with the conical portion of the axle;
 a braking force takeup member separably fitted on a free end of the torsion tube remote from the centering bearing surface.

Making the torsion tube integrally with the support member serves to eliminate bolts for securing those two elements together, which bolts in conventional brakes generally extend inside the torsion tube, thereby requiring it to be spaced apart from the axle. The present configuration makes it possible to make a torsion tube that substantially extends the centering bearing surface, i.e. very close to the large-diameter portion of the axle, thus enabling the radial height of the disks to be maximized.

Preferably, the free end of the torsion tube includes a portion projecting radially towards the axle and adapted to receive bolts for fastening the force takeup member. This enables advantage to be taken of the conical shape of the axle and of the space made available thereby between the torsion tube and the axle for receiving the portion projecting radially from the tube towards the axle, on which the force takeup member is fastened. The bolts securing the braking force takeup member to the torsion tube thus lie within the torsion tube. The bolts fastening the braking force takeup member are subjected mainly only to the force from the actuators (unlike bolts securing a ring to an associated torsion tube, which bolts are also subjected to the entire braking torque), such that the bolts used can be of reasonable dimensions and can thus easily be received in the space between the torsion tube and the axle.

The portion projecting radially from the torsion tube towards the axle is preferably a collar, thereby increasing the stiffness of the tube.

Also preferably, the braking force takeup member includes a centering bearing surface that co-operates directly with the cylindrical portion of the axle downstream from the conical portion.

BRIEF DESCRIPTION OF THE DRAWING

The invention can be better understood in the light of the following description given with reference to the sole FIGURE showing a section view of a brake constituting a particular embodiment of the invention.

DETAILED DESCRIPTION OF THE INVENTION

With reference to the sole FIGURE, the brake of the invention is particularly adapted for fitting to an aircraft having an axle 1 with a conical portion 2 prior to the final portion 3 of the axle that receives a wheel 4 including a rim 40, in this case made up of two half-rims.

This type of axle is to be found in particular when, for various reasons, and in particular because of problems of tire pressure on the ground, it is necessary to place the wheels farther away from the center of the undercarriage 5 carrying the axle. In order to avoid excessively increasing the weight of the axle, provision is generally made on the axle 1 for a large-diameter cylindrical upstream portion 6, a conical portion 2, and a smaller-diameter cylindrical downstream portion 3 that receives the wheel 4.

Advantage is taken of the presence of the conical portion 2 for installing a brake of a novel type described in greater detail below. The brake comprises a stack of disks 10 with alternating rotor disks that turn with the wheel 4 and stator disks that are prevented from rotating. The disks are engaged on a structural part 11 that extends around the axle 1, essentially in register with the conical portion 2 of the axle 1.

The structural part 11 comprises a torsion tube 12 having splines or keys 13 extending on its outside surface for co-operating with the stator disks in order to prevent them from turning (one of them is shown in section in the FIGURE). The torsion tube 12 is terminated beside the undercarriage 5 by a support member 14 adapted to receive braking actuators 15, in this case electromechanical actuators. The support member 14 includes a fitting 16 for taking up torque that co-operates with a torque takeup bar or catch (not shown) to prevent the torsion tube from turning relative to the axle 1. At the root of the support member 14 there extends a bearing surface 17 forming an integral portion of the structural part 11 on the axle 1 for the purpose of centering the structural part 11 thereon. It should be observed that the support member 14, the centering bearing surface 17, and the torsion tube 12 are all made of the same material and form a single part. It should also be observed that the torsion tube 12 extends in register with the conical portion 2 of the axle 1, substantially extending the centering bearing surface 17, and thus very close to the conical portion 2.

The free end of the torsion tube 12 remote from the support member 14 carries a collar 20 that extends radially towards the axle 1. This collar stiffens the torsion tube 12. A braking force takeup member 21 is fitted against the collar 20 and the disks are pressed thereagainst when a force is applied by the actuators 15. The braking force takeup member 21 is connected in removable manner to the torsion tube 12 by means of bolts 22 that extend through the collar 20, such that the bolts 22 extend in the space situated between the torsion tube 12 and the conical portion of the axle 1. Advantage is thus taken of this space made available by the conical shape of the axle for housing the fastening bolts 22 of the braking force takeup member 21 to the torsion tube 12. These bolts are of reasonable size since they are subjected mainly only to the force imparted by the actuators 15 and are subjected little to the torsion generating by the braking.

Thus, unlike most brakes presently in service, it is not the support member 14 that is made removable, but the braking force takeup member 21, thereby making it easier to replace the disks. The disks in this configuration can be replaced while the torsion tube 12 remains in place on the axle 1. To do this, it suffices to remove the wheel 4 and then to dismantle the braking force takeup member 21 in order to have access to the disks.

Eliminating connection bolts between the support member 14 and the torsion tube 12 makes it possible to reduce the diameter of the torsion tube and thus makes it possible to place it as close as possible to the cylindrical upstream portion 6 of the axle 1. In the figure, it can be seen that the diameter of the cylindrical portion of the torsion tube 12 has been reduced to such an extent for the purpose of increasing the radial height of the disks, that the diameter of the tubular cylindrical portion 12 is not large enough to penetrate into the rim 40 of the wheel 4 outside its hub 41 that receives conical roller bearings 30. This small diameter makes it possible to use disks of greater height, but to the detriment of said disks occupying the space available in the rim 40 around the hub 41.

As shown, in this configuration, it is possible for some of the disks 10 to lie outside the rim 40 of the wheel 4. It is then appropriate to provide splines or keys 32 that extend far enough outside the rim 40 of the wheel 4 to co-operate with the rotor disks that lie outside the rim 40 of the wheel 4. In this case, the keys 32 have two fastening points on the rim 40: firstly end portions 33 housed in respective orifices 34 of the rim 40 of the wheel 4, and secondly portions 35 that are bolted to lugs 36 projecting outside the rim 40. As can be seen in the figure, a substantial fraction of each key 32 extends outside the rim 40 to co-operate with rotor disks that lie outside the rim 40.

In this example, and in accordance with a preferred embodiment of the invention, the braking force takeup member 21 includes a centering bearing surface 23 for bearing against the axle 1, thus enabling the associated end of the torsion tube 12 to be centered on the cylindrical portion 3 downstream from the conical portion 2 of the axle 1. In this way, the structural part 11 is centered at both ends (by the centering bearing surface 17 of the ring and by the centering bearing surface 23 of the force takeup member), thereby helping diminish brake vibration.

The invention is not limited to the above description, and on the contrary it covers any variant coming within the ambit defined by the claims.

In particular, although it is stated that the free end of the torsion tube is terminated by a collar extending radially towards the axle, thereby contributing to stiffening the torsion tube, it is possible more generally to provide a portion projecting radially towards the axle, such as for example a plurality of lugs each capable of receiving a bolt for fastening the braking force takeup member to the torsion tube.

In addition, although it is stated that the braking force takeup member is fitted with a bearing surface for centering on the axle, said centering bearing surface could be carried by the projecting portion of the torsion tube. Provisions can then advantageously be made for the braking force takeup member to be centered on the torsion tube itself.

Finally, although it is stated that the actuators are of the electromechanical type, the ring could receive hydraulic actuators, such as hydraulic pistons.

What is claimed is:

1. An aircraft brake for braking a wheel received on an axle presenting in succession a large-diameter cylindrical upstream portion, a conical portion, and a smaller-diameter cylindrical downstream portion suitable for receiving the wheel, the brake comprising:
   a stack of disks;
   a structural part engaged on the axle and having the disks mounted thereon, the structural part comprising:
      a ring for receiving braking actuators and including a centering portion for centering the structural part on the upstream cylindrical portion of the axle; and
      a torsion tube receiving the disks, the torsion tube being made integrally with the ring and the centering portion and extending substantially to extend the centering portion in register with the conical portion of the axle; and
   a braking force takeup part separably fitted on a free end of the torsion tube remote from the centering portion; and
   wherein the braking force takeup part includes a bearing surface for centering on the axle.

2. A brake according to claim 1, in which the free end of the torsion tube carries a portion projecting towards the axle and arranged to receive bolts for securing the braking force takeup part.

3. A wheel and brake assembly, comprising:
   a brake according to claim 1, and
   a wheel having a rim adapted to co-operate with said brake, wherein a tubular cylindrical portion of the torsion tube stops axially before a hub of the rim, the hub receiving a bearing for guiding the rim in rotation on the axle.

4. A wheel and brake assembly, comprising:
   a brake according to claim 1, and
   a wheel having a rim adapted to co-operate with said brake, wherein the torsion tube has a tubular cylindrical portion that stops axially before a hub of the rim, said hub receiving a bearing for guiding the rim in rotation on the axle.

\* \* \* \* \*